United States Patent
Frantz et al.

[19]

[11] Patent Number: 5,898,845
[45] Date of Patent: Apr. 27, 1999

[54] ASSIGNING AND UTILIZING OVERLAPPING ADDRESS SPACE FOR MULTIPLE CARDS ON A COMMON COMPUTER BUS

[75] Inventors: Robert H. Frantz, Plano; George Elwell, Forney; Huey Dixon, Rowlett; Joe Griffis, Dalllas; Steve Hankins, Carrollton, all of Tex.

[73] Assignee: InterVoice Limited Partnership, Reno, Nev.

[21] Appl. No.: 08/739,685

[22] Filed: Oct. 29, 1996

[51] Int. Cl.⁶ .................................................. G06F 12/00
[52] U.S. Cl. ........................ 395/284; 395/280; 395/281; 395/828; 395/829
[58] Field of Search ..................................... 395/280, 281, 395/284, 282, 828, 829, 830; 711/5, 203, 208, 209, 200, 202, 210

[56] References Cited

U.S. PATENT DOCUMENTS

| | | | |
|---|---|---|---|
| 4,787,030 | 11/1988 | Harter et al. | 711/5 |
| 5,675,831 | 10/1997 | Caputo | 395/830 |
| 5,745,786 | 4/1998 | Juall | 395/829 |

*Primary Examiner*—Ayaz R. Sheikh
*Assistant Examiner*—Ario Etienne
*Attorney, Agent, or Firm*—Fulbright & Jaworski L.L.P.

[57] ABSTRACT

A computer card mounted in a computer, which has at least one other card having a similar functionality to the card, with the cards being connected to a common bus. Both cards also have overlapping memory, I/O, and interrupt selections assigned by a plug-and-play device. The card comprises a unique handle that is latched to the card by the plug-and-play device. If a card comparator detects a match between the unique handle and the selection data, a selector enables the card. If the comparator does not detect a match between the unique handle and the selection data, the selector disables the card.

20 Claims, 2 Drawing Sheets

ASSIGNING AND UTILIZING OVERLAPPING ADDRESS SPACE FOR MULTIPLE CARDS ON A COMMON COMPUTER BUS

TECHNICAL FIELD OF THE INVENTION

This invention relates to computer bus arrangements and more particularly to an arrangement of a system and method for allowing multiple cards to utilize the same address space.

BACKGROUND OF THE INVENTION

Open platform computers allow the addition of hardware cards to a computer bus in a computer which provides additional functionality to the computer. These cards can take the form of a video card, a LAN interface card, a telephony interface card, etc. Most common buses use address space as the mechanism to distinguish when a particular computer card is being selected. For example, when computer software requires some video function to be performed, the software is connected to the video card through a specific address range. Typically, each board is assigned a unique address space, usually to a traditional address location, such as the traditional location for video cards or the traditional location for disk drive interface cards.

Usually, the computer bus does not allow for multiple cards of the same type, i.e. multiple disk drive cards or multiple LAN cards. If multiple card capability were supported, individual address blocks for each card would be required, such that if a particular video card requires a 16 k address block, and there were four such video cards, then a 4×16 k block of address space would be utilized. Most computers are limited in their total available address space, and may not have sequential or linear address blocks available. This can complicate the board design which is intended to be installed in a computer having multiple copies of the same card. The addressable range may have to be broken into smaller pieces so that it can fit into the address space available on the computer. This not only increases the cost of the board design, but also requires increased complexity in the software which controls the communication with these cards. The existing system makes it difficult, if not impossible, to install more than a few cards of the same type in a computer with the limited address space.

Therefore, there exists a need in the art for a mechanism to allow multiple cards of the same type or different types in combination to be installed in large numbers on common computer buses.

Furthermore, there is a need in the art for a system which has quick and efficient mechanisms to select these cards to avoid unnecessary machine operations and software instructions to select and communicate with the cards.

There is a also a need in the art for a system which will allow multiple cards of the same type to be utilized at the same time without fragmenting the memory and without having the card address memory scattered at various places throughout the memory space.

SUMMARY OF THE INVENTION

These and other objects and features are achieved by a system in which two mechanisms are used. The first mechanism configures each card for a memory address block, and a second mechanism, enabled during normal operation, selects that single card and simultaneously deselects other cards.

The first mechanism which is a method for common computer buses to isolate one card among many and place it into a configuration state. The preferred method is a modification to the plug-and-play specification for the ISA bus architecture. In the standard plug-and-play, each card, whether the same type or not, is assigned its own individual address block. In the invention, cards of the same type are assigned a common address block. The phrase "of the same type" can mean having identical cards, or cards that perform a similar function, but may have a different manufacturer, capability, version, etc. For example, the cards can be identical modem cards, such as three 28.8 k baud rate cards, or the cards can be a variety of different types of modem cards, such as a 9600 baud rate card, a 14.4 k card, and a 28.8 k card. Each card of the same type would also be assigned a unique handle identifier. The processor selects a particular card from a plurality of cards of the same type by writing card selection data to the bus. The data contains a reference to the unique handle. Each card at that memory location would compare the card selection data with its handle. If there is a match, then the selected card enables itself. If there is not a match, then the non-selected card, disables itself. This process would repeat each time card selection data is written to the common address location.

This invention addresses the mechanism to select one card out of many which have been mapped to the same address space block on a common computer bus.

It is a technical advantage of our invention to first have a single computer operation necessary to select one card which automatically and simultaneously deselects all other cards.

It is another technical advantage that a single address block is used for multiple cards which allows more available space for other types of cards that do not implement or incorporate the same type of mechanism.

It is another technical advantage that the software I/O structure is simplified for communication with the cards.

It is still another technical advantage that this invention is an inexpensive hardware circuit solution which is an addition to standard designs such as video cards and disk drive cards.

It is still another technical advantage that it does not slow down the access time to any standard design cards.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 4:
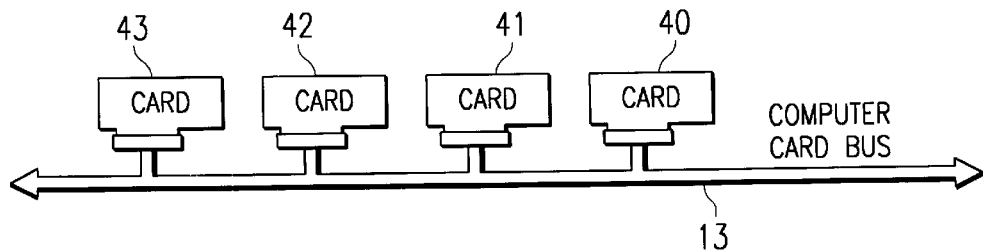
FIG. 4 shows a prior art computer card bus.

Before beginning a discussion of the implementation of our invention, it would be helpful to review FIG. 4 which shows a common computer card bus 13 which is usually comprised of an address bus, data bus and control signals for read-write and wait state logic. The bus allows one or more cards to be installed as shown as items 40, 41, 42 and 43. The cards may be of the same functional type or may be a variety of types or any combination thereof.

FIG. 4, for example, can have a video card 40, a disk drive card 41, and a memory card 42. Each card would be assigned, either through a hardware or software arrangement, a beginning address that is unique for that particular card. For example, card 40 could be assigned an address beginning at 2000, card 41 may have an address beginning at 4000, and card 42 might be at address 8000. If the cards were the same type, for instance, all telephony interface cards, each would still have to be assigned a unique address space even though the functionality and the software I/O construct is the same for each card. This can use up the available memory space quite quickly in most common computer systems and limit the total number of cards that can be installed in the system, especially if the cards have a wide address range requirement. For instance, if each card has an address range of 100,000, then card 41, assigned an address of 2000, would consume the space from 2000 to 120000. Card 42 would then utilize address range 120000 to 220000. This quickly uses up available space. An additional problem can occur when the card space assignment conflicts with space already committed to a standard functionality, such as keyboard interface, parallel interface or serial interface. Those spaces may fall in the middle of the available address space which cards 40, 41, 42 or 43 may want to span across, thus forcing those cards to be located at even higher addresses or be fragmented. Thus, situations can occur where the cards cannot be easily configured in a system due to prior requirements for the address space and address range of the boards.

Figure 1:
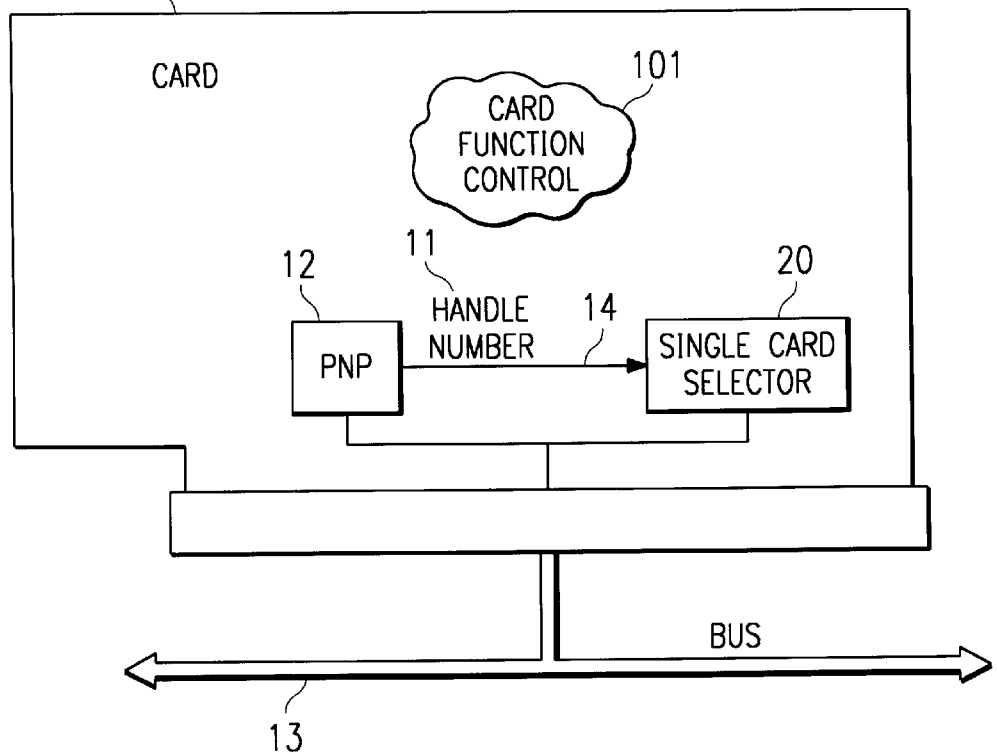
FIG. 1 shows a card and bus arrangement of the invention.

Assume now that one or more of the cards in FIG. 4 is now the card shown in FIG. 1, such as card 10, which incorporates the invention. The invention utilizes two elements, the plug-and-play isolation and configuration mechanism 12, and the single card selector logic 20 connected together by bus 14. During initial system configuration and installation, plug-and-play mechanism 12 is used to isolate each card on the bus, one at a time, at which time the software configures the beginning address and the address range assignment for that card and the card ID is set. Plug-and-play 12 uses a series of coded reads and writes to the bus to select a card by its serial number which is unique for each card. After a card has been selected, all other cards are deselected until such time as the selected card has been fully programmed with a beginning address and an ending address range.

Plug-and-play 12 is described in plug-and-play specification. It is a series of reads and writes which can require 72 pairs of reads, or over 140 read operations to isolate a card on a bus based on its serial number. All other cards remain deselected. At that point, the software in the system can configure the card for a starting address and an address range for the card to decode and locate itself on the computer memory space. Therefore, the card does not need to have a preassigned hardware address space range or beginning address.

When the system uses plug-and-play mechanism 12 to isolate a single card and read its serial number, the system then takes the serial number, manufacturer identification and card type identification and accesses a file supplied with the card which describes the card. The file is located on a floppy disk (not shown) which would be shipped with the card. The file describes the available options for the card. For instance, which available address may be selected for the beginning address and at which of the available address ranges the card may be set. For example, the file may indicate that a 2 k, 4 k or 8 k address block is needed and would provide data as to necessary starting addresses, if any. The plug-and-play specification has an extended function that allows the software of the computer to automatically configure these parameters on the boards to resolve conflicts. For example, if there are three cards that try to start by default at the same address, the plug-and-play configuration software will attempt to resolve that conflict by moving each card to a unique address space with its own address block. This may not be possible due to the hardware resources that are already installed in the system, or due to current unchangeable commitments in the memory space of the computer.

There is still a need to allow multiple cards to reside at the same address. Even though the cards can be isolated and configured using the standard plug-and-play mechanism, the cards cannot be located at the same address space and then isolated one at a time without many operations of the computer to select one card from among the many cards.

The invention allows a new mechanism in addition to the standard plug-and-play hardware to be added to the card which is configured at the time the card is isolated during configuration. This mechanism is a handle or a card number that is assigned by the software which is latched into the card and stored on the card. The modified plug-and-play operates very similar to the standard version described above, but instead of assigning each card its own address block, the modified version looks for similar cards and assigns them to a common address block. Then each card in the common block is given a unique handle number 11, and that handle number 11 is located at a given I/O port address or memory address which is common among all of the other similar cards. The phrase "similar cards" is defined to mean identical cards or cards that have a similar function, but have a different manufacturer, capability, version, etc. During run time, the similar cards look for all writes to that one I/O or memory address. Thus, when the software wants to select one card among many similar ones, the software will write to that I/O port address.

For example, suppose B0 is the handle number of the card that the software wants to select. All of the similar cards at the same address will see this write and compare that to their own handle numbers which were assigned to them during configuration. If the number matches their handle, they will enable themselves. If the handle does not match, the card disables itself. Because each card has a unique handle number, only one card will be selected each time this operation is performed and all other cards will be deselected, therefore allowing a single software operation to select one card and disable all other cards. This is much faster than the many operations necessary under the plug-and-play specification to select one card from among many. This system then allows the run time software to perform real-time tasks without slowing their operation.

Figure 2:
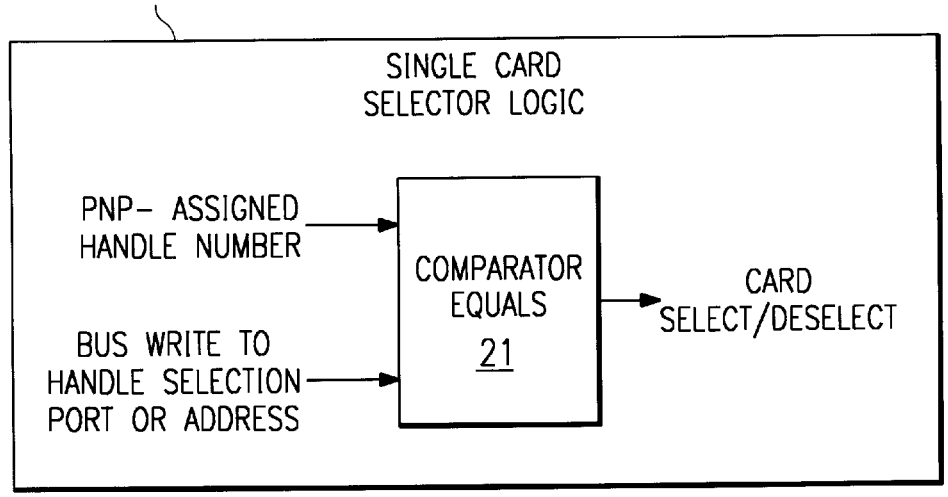
FIG. 2 shows the card comparator operation of the invention.

FIG. 2 shows the basic comparator operation, wherein plug-and-play block 12 in FIG. 1 has latched the card handle number 11 and is passing it to the single card selector logic 20. The current bus state from the card bus is constantly compared with the card handle number. When the handle number is matched, the comparator outputs a match signal which selects the card until deselected. The next time that there is a write to that I/O port address, and the handle number does not match that of the card, the comparator is not equal and the card is deselected until such time as another operation occurs and the handle matches.

Figure 3:
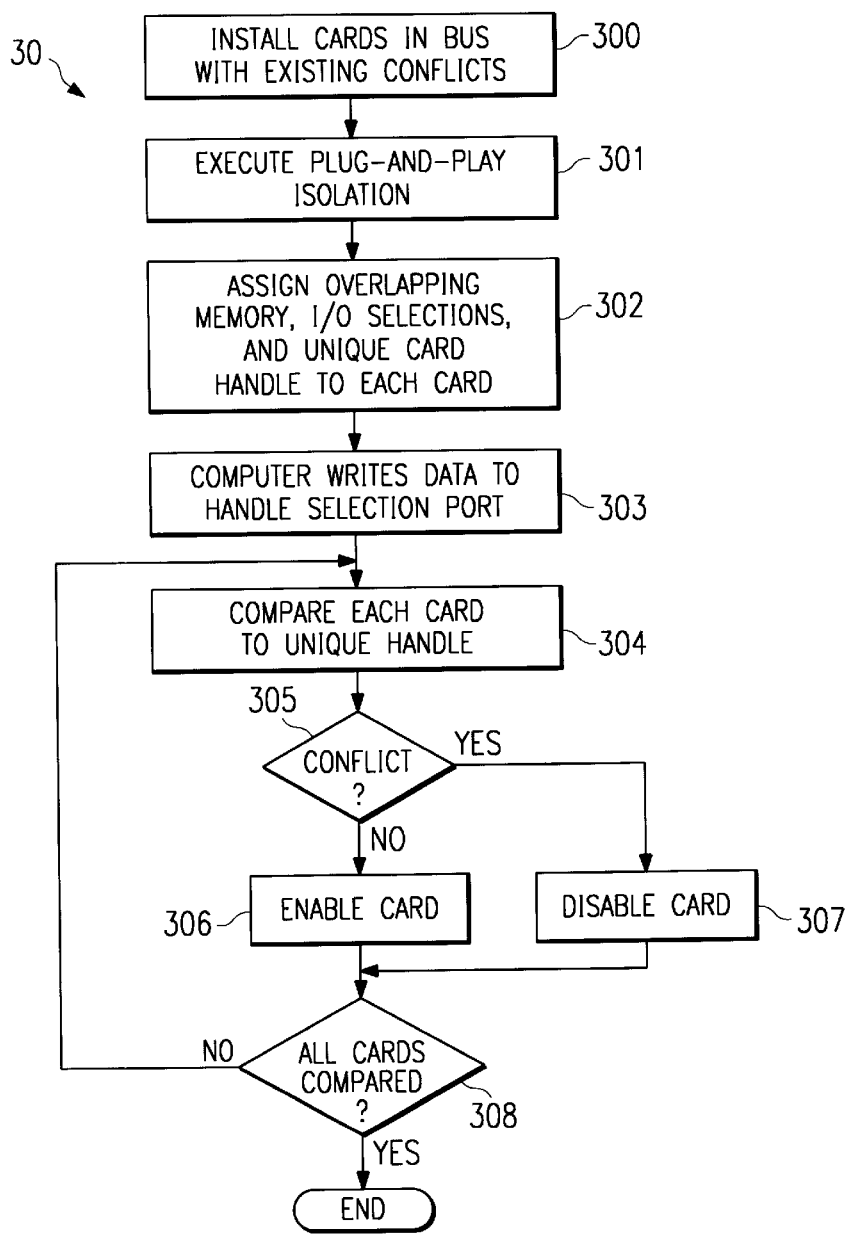
FIG. 3 shows a flow chart depicting the basic steps of the invention.

FIG. 3 shows the basic steps of operation. Step 300 is to install the cards in the bus, with any existing conflicts that may be programmed into the cards, either through hardware or software configuration. Step 301 is to execute the plug-and-play isolation and configuration process, step 302 assigns overlapping memory, I/O and interrupt selections for similar cards, and assigns a unique card handle to each card. Step 303 occurs during run time when the computer writes to the bus handle selection port or address. In step 304, each card compares the written value to its unique handle number and via steps 305, 306, 307 enables or disables itself accordingly.

The system allows only one card to be enabled at any one time, with all other cards being disabled due to the unique nature of the handle value on each card. Each time the computer software wants to disable the current card and enable a new card only step 303 is repeated. Only a single enable must be performed and the current card that is enabled will disable itself.

Also note that the handle can come from another card as well as from the computer, thereby allowing the system to reconfigure itself dynamically.

Although the present invention and its advantages have been described in detail, it should be understood that various changes, substitutions and alterations can be made herein without departing from the spirit and scope of the invention as defined by the appended claims.

What is claimed is:

1. A method for selecting and de-selecting a particular card on a bus comprising the steps of:
   assigning a unique handle identification to each of a plurality of cards having a common bus address location and a similar function;
   writing card selection data to the bus, the card selection data containing a selected handle and being written at the common address location;
   comparing the card selection data with the unique handle of the particular card to determine whether the unique handle matches the card selection data; and
   as a result of the step of comparing, selecting or deselecting the particular card for or from further data processing.

2. The method of claim 1, further comprising the step of:
   selecting the particular card when a match has occurred by outputting a matched signal which enables the particular card until deselected.

3. The method of claim 1, further comprising the step of:
   deselecting the particular card when a match did not occur by outputting a non-matched signal which disables the particular card until selected.

4. The method of claim 2, further comprising the steps of:
   writing another card selection data to the address location;
   comparing the unique handle of the particular card to said another card selection data to determine whether the unique handle matches said another card selection data;
   wherein a match has not occurred between the unique handle and said another card selection data, resulting in de-selection of the particular card.

5. The method of claim 3, further comprising the steps of:
   writing another card selection data to the address location;
   comparing the unique handle of the particular card to said another card selection data to determine whether the unique handle matches said another card selection data;
   wherein a match has occurred between the unique handle and said another card selection data, resulting in selection of the particular card.

6. The method of claim 1, wherein:
   the step of comparing is performed upon the particular card.

7. The method of claim 1, wherein:
   the step of assigning is performed under control of an installation program.

8. A device comprising:
   a card for use in a computer which has a common bus to which at least one other card having a similar functionality thereto can be connected, the card having an address location for receiving card selection data,
   said address location identical to the address location of said at least one other card; and
   a memory for accepting a unique handle for subsequent use in selecting and deselecting the card for the processing of data to and from said bus.

9. The device of claim 8, further comprising:
   a comparator for comparing the unique handle of the card with said card selection data written on the bus to said address location by the computer.

10. The device of claim 8, further comprising:
    a comparator for comparing the unique handle of the card with said card selection data written on the bus to said address location by another card.

11. The device of claim 9, further comprising:
    a selector for enabling the card when the comparator detects a match between the unique handle and the selection data.

12. The device of claim 9, further comprising:
    a selector for disabling the card when the comparator does not detect a match between the unique handle and the selection data.

13. The device of claim 8, further comprising:
    a plug-and-play device for assigning the unique handle to the card during installation of the card.

14. The device of claim 8, wherein:
    the unique handle is assigned during installation of the card by an installation program.

15. A computer comprising:
    a bus;
    a plurality of process control cards having similar functions, all connected to the bus, and each card having a common address location for receiving card selection data;
    a plurality of unique handles, each handle latched to a respective card of said plurality of cards;
    a plurality of comparators, each comparator associated with a respective card of said plurality of cards, each comparator for comparing a respective unique handle with selection data written on the bus to said common address location; and a plurality of selectors, each selector associated with a respective card of the plurality of cards, each selector for enabling the respective card when a respective comparator detects a match between a respective unique handle and the selection data, and for disabling the respective card when the respective comparator does not detect a match between the respective unique handle and the selection data.

16. The computer of claim 15, further comprising:

a plug-and-play device that assigns the unique handle to the card.

17. A method for configuring a plurality of cards installed in a computer with at least two of the plurality of cards having a similar function, the method comprising the steps of:

determining which of said plurality of cards have the similar function;

allocating a common address block for the cards having the similar function; and assigning a unique handle identification to each card having the common address block.

18. The method of claim 17, further comprising the step of:

loading information about the cards having the similar function from a file located on a data storage medium; and determining the common address block based on the information.

19. The method of claim 18, further comprising the step of:

deriving the unique handle identification for each card having the common address block from the information.

20. The method of claim 17, wherein:

the unique handle identification is used in the selection of a particular card for the cards having the common address block.

* * * * *